US008937929B2

(12) United States Patent
Abe et al.

(10) Patent No.: US 8,937,929 B2
(45) Date of Patent: Jan. 20, 2015

(54) BASE STATION APPARATUS, MOBILE TERMINAL APPARATUS AND COMMUNICATION CONTROL METHOD

(75) Inventors: Tetsushi Abe, Tokyo (JP); Nobuhiko Miki, Tokyo (JP); Yusuke Ohwatari, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 217 days.

(21) Appl. No.: 13/704,250

(22) PCT Filed: Jun. 10, 2011

(86) PCT No.: PCT/JP2011/063400
§ 371 (c)(1),
(2), (4) Date: Feb. 25, 2013

(87) PCT Pub. No.: WO2011/162112
PCT Pub. Date: Dec. 29, 2011

(65) Prior Publication Data
US 2013/0156015 A1    Jun. 20, 2013

(30) Foreign Application Priority Data

Jun. 21, 2010  (JP) .................................. 2010-141017

(51) Int. Cl.
*H04W 24/02*  (2009.01)
*H04L 5/00*  (2006.01)
*H04W 4/06*  (2009.01)
(Continued)

(52) U.S. Cl.
CPC ............. *H04W 24/02* (2013.01); *H04L 5/0007* (2013.01); *H04L 5/005* (2013.01); *H04L 5/0058* (2013.01); *H04W 4/06* (2013.01); *H04W 24/10* (2013.01);
(Continued)

(58) Field of Classification Search
CPC ....................................................... H04W 24/02
USPC .................................. 370/336, 329, 252, 328
See application file for complete search history.

(56) References Cited

U.S. PATENT DOCUMENTS 8,305,987 B2 * 11/2012 Fong et al. .................... 370/329
8,654,734 B2 *  2/2014 Chandrasekhar et al. .... 370/330
(Continued)

OTHER PUBLICATIONS

Notification of Reasons for Rejection in corresponding Japanese application No. 2010-141017 dated Apr. 30, 2013 (4 pages).
(Continued)

*Primary Examiner* — Rasheed Gidado
(74) *Attorney, Agent, or Firm* — Osha Liang LLP

(57) ABSTRACT

Provided are a base station apparatus, a mobile terminal apparatus and a communication control method capable of selecting a CSI-RS arrangement flexibly in accordance with a system configuration. The base station apparatus has a CSI-RS arrangement section (211) configured to arrange a CSI-RS in a resource reserved for broadcasting when a mobile terminal apparatus (10) is notified of position information of the CSI-RS by broadcasting or in a resource associated with an cell ID of a serving area when the mobile terminal apparatus (10) obtains the position of the CSI-RS based on the cell ID; an identification information generating section (212) configured to generate an identification bit for identifying whether the CSI-RS is arranged in the resource reserved for broadcasting or in the resource associated with the cell ID; and a transmission/reception section (203) configured to transmit the identification information to the mobile terminal apparatus.

17 Claims, 11 Drawing Sheets

(51) Int. Cl.
*H04W 24/10* (2009.01)
*H04W 74/00* (2009.01)
*H04W 72/00* (2009.01)

(52) U.S. Cl.
CPC ........... *H04W 74/006* (2013.01); *H04W 72/005* (2013.01)
USPC ............ 370/336; 370/329; 370/252; 370/328

(56) References Cited

U.S. PATENT DOCUMENTS

2011/0244877 A1* 10/2011 Farajidana et al. ........ 455/452.2
2012/0120903 A1* 5/2012 Kim et al. ..................... 370/329

OTHER PUBLICATIONS

Qualcomm Inc.; "Further details on CSI-RS"; 3GPP TSG-RAN WG1 #59bis, R1-100681; Valencia, Spain; Jan. 18-22, 2010 (11 pages).
Qualcomm Europe; "Details of CSI-RS"; 3GPP TSG-RAN WG1 #59, R1-094867; Jeju, Korea; Nov. 9-13, 2009 (6 pages).
International Search Report issued in PCT/JP2011/083400 mailed Aug. 30, 2011 (2 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

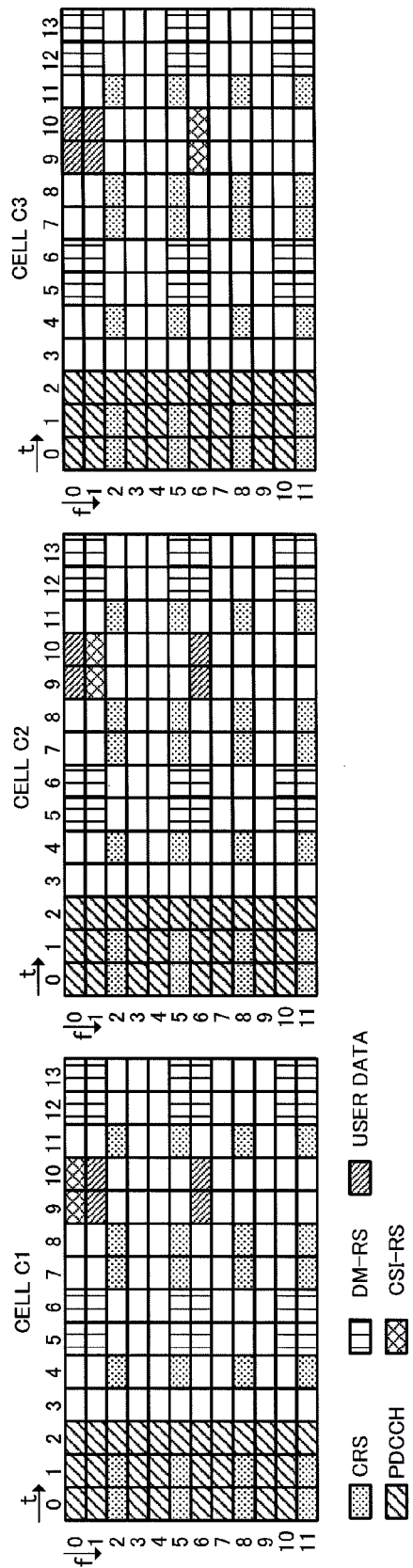
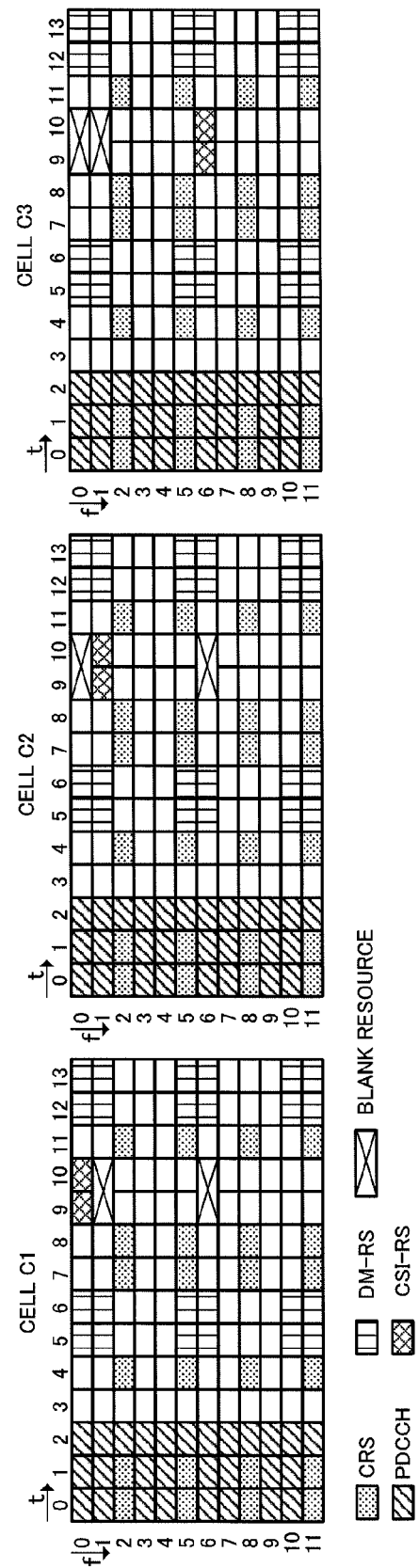
FIG. 5A
FIG. 5B

BASE STATION APPARATUS, MOBILE TERMINAL APPARATUS AND COMMUNICATION CONTROL METHOD

TECHNICAL FIELD

The present invention relates to a base station apparatus, a mobile terminal apparatus and a communication control method in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, Non-Patent Literature 1).

In a third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)). Accordingly, in the future, it is expected that these multiple mobile communication systems will coexist, and configurations (base station apparatus, mobile terminal apparatus, etc.) that are capable of supporting these multiple systems will become necessary.

In the downlink of the LTE system, the CRS (Common Reference Signal) is defined as a cell-common reference signal. This CRS is used for demodulation of transmission data, measurement of downlink channel quality (CQI: Channel Quality Indicator) for scheduling and adaptive control, and measurement of an average state of the downlink propagation channel for cell search and handover (mobility measurement).

In the meantime, in the downlink of the LTE Advanced (LTE-A) system, study has been made about the CSI-RS (Channel State Information—Reference Signal) defined specially for CQI measurement, in addition to the CRS. The CIS-RS can be used for CQI measurement in plural cells in consideration of transmission/reception of data channel signals by Coordinated Multiple Point (CoMP). The CSI-RS is different from the CRS in that the CSI-RS is used for CQI measurement of adjacent cells while the CRS is used for CQI measurement of a serving cell only.

CITATION LIST

Non-Patent Literature

Non-Patent Literature 1: 3GPP, TR25.912 (V7.1.0), "Feasibility study for Evolved UTRA and UTRAN", September 2006

SUMMARY OF THE INVENTION

Technical Problem

By the way, in the introducing of the CSI-RS, study has been made about CSI-RS arrangement in radio resources. This CSI-RS arrangement needs to be changed in accordance with the system configuration, which becomes a problem.

The present invention was carried out in view of the foregoing and aims to provide a base station apparatus, a mobile terminal apparatus and a communication control method all capable of choosing a CSI-RS arrangement flexibly in accordance with the system configuration.

Solution to Problem

The present invention provides a base station apparatus comprising: an arrangement section configured to arrange a CSI (Channel State Information)-RS in a resource reserved for broadcasting when a mobile terminal apparatus is notified of position information of the CSI-RS by broadcasting or in a resource associated with an area identifier of a serving area when the mobile terminal apparatus obtains the position information of the CSI-RS based on the area identifier; an identification information generating section configured to generate identification information for identifying whether the CSI-RS is arranged in the resource reserved for broadcasting or in the resource associated with the area identifier; and a transmission section configured to transmit the identification information to the mobile terminal apparatus.

Technical Advantage of the Invention

According to the present invention, if the CSI-RS arrangement where the CSI-RS is arranged in the resource reserved for broadcasting not in the resource associated with the area identifier is selected, the CSI-RS arrangement is not affected by area identifier design. On the other hand, if the CSI-RS arrangement where the CSI-RS is arranged in the resource associated with the area identifier is selected, the mobile terminal apparatus obtains position information of the CSI-RS from the area identifier of a serving area, thereby eliminating signaling of the position information of the CSI-RS. Therefore, it is possible to select CSI-RS arrangement flexibly in accordance with the system configuration in such a manner that when a higher priority is given to the system design flexibility, the CSI-RS is arranged in the resource reserved for broadcasting and when a higher priority is given to reduction in signaling overhead, the CSI-RS is arranged in the resource associated with the area identifier.

BRIEF DESCRIPTION OF THE DRAWINGS

FIG. 5 provides diagrams for explaining muting in CSI measurement using a CSI-RS;

DESCRIPTION OF EMBODIMENTS

First description is made about the CRS (Common Reference Signal) defined in the downlink of the LTE System and the CSI-RS (Channel State Information-Reference Signal) which is considered to be defined in the downlink of the LTE-A system, prior to a communication control method according to the present invention.

Figure 1A:
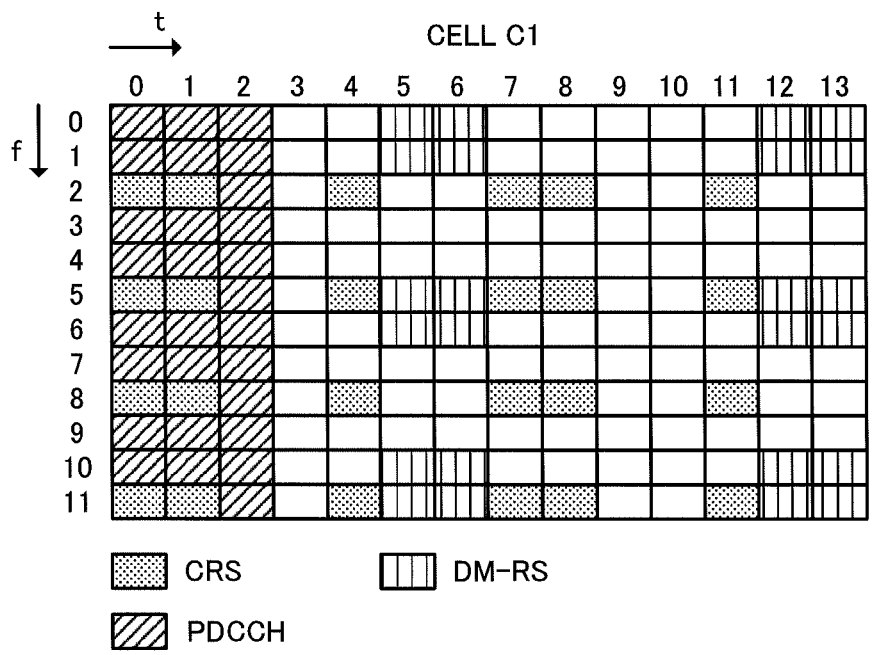
FIG. 1 provides diagrams for explaining the CRS configuration.
Figure 1B:
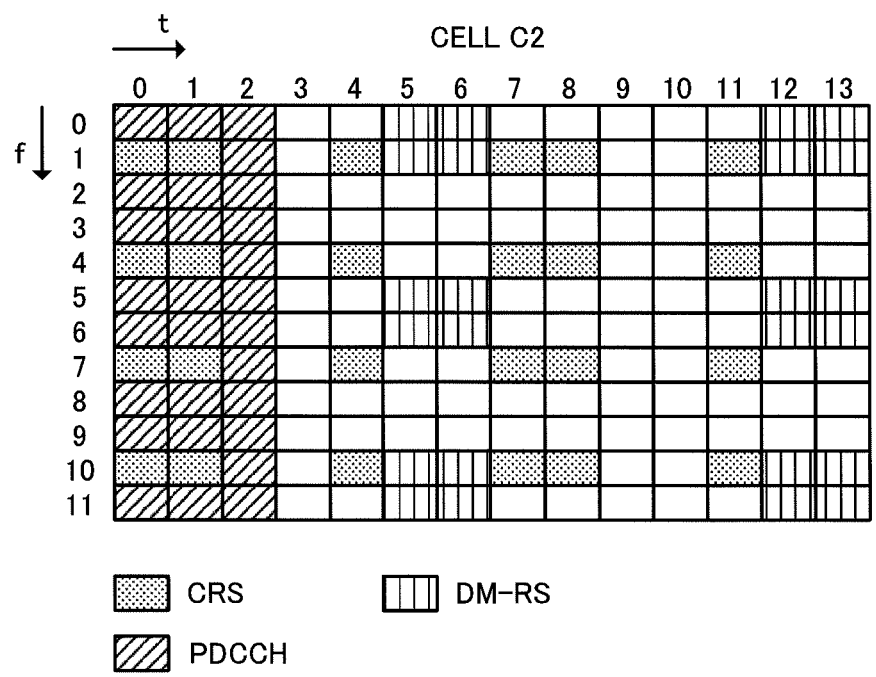

FIG. 1 provides diagrams for explaining the CRS configuration. FIGS. 1A and 1B are explanatory views of arrangement of the CRS. CRS is assigned to each resource block and to each subframe.

The CRS is transmitted to a mobile terminal apparatus by a cell-common reference signal at predetermined frequency, time, transmission power and phase. These frequency and transmission power of the CRS are recognized by the mobile terminal apparatus side with use of a cell ID (area indicator) or a broadcast signal, which are described later. The CRS is generally used for demodulation of user data and downlink channel measurement in the mobile terminal apparatus. The channel measurement using a CRS includes measurement of downlink channel quality (CQI: Channel Quality Indicator) for scheduling and adaptive control and measurement of an average state of the downlink propagation channel for cell search and handover (mobility measurement).

As illustrated in FIG. 1A, CRSs are arranged in one resource block defined in the LTE so as not to coincide with user data and DM-RSs (DeModulation-Reference Signals). One resource block consists of twelve consecutive subcarriers in the frequency domain and fourteen consecutive symbols in the time domain. And, as illustrated in FIG. 1B, the CRSs are shifted in the frequency domain in every cell thereby to prevent interference between cells. In the examples illustrated in FIGS. 1A and 1B, the CRSs in the cell C2 are mapped to the positions shifted in the frequency domain by one subcarrier.

The CRS is specified by parameters such as a position, a sequence and transmission power. Out of these parameters, the position of the CRS is associated with a cell ID. In other words, the CRS position shifted in the frequency domain is determined by the cell ID, and therefore, the mobile terminal apparatus specifies a CRS arrangement by recognizing the cell ID of a serving cell. And, the CRS sequence is associated with the cell ID and the CRS transmission power is notified of by a broadcast signal. Here, the cell ID to specify the CRS position and sequence is recognized by the mobile terminal apparatus through cell search.

Figure 2:
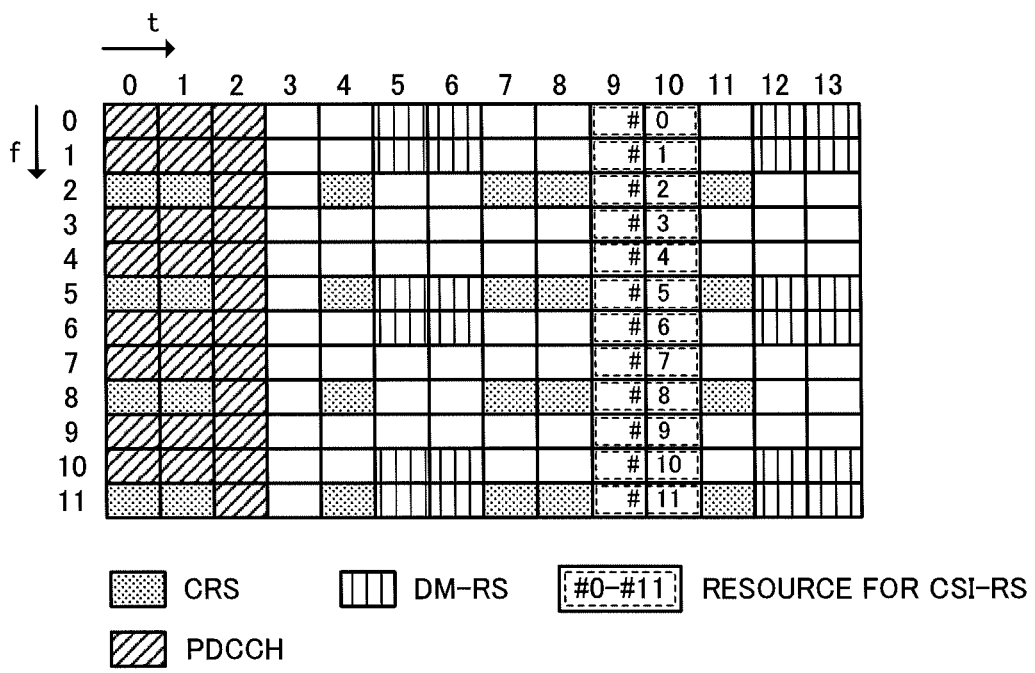
FIG. 2 is an explanatory view of a CSI-RS arrangement.

Next description is made about the CSI-RS configuration which is now under study for the downlink of the LTE-A system. FIG. 2 is an explanatory view of a CSI-RS arrangement. Unlike the CRS, the CSI-RS is not allocated to every resource block and every subframe, but is allocated at predetermined intervals.

The CSI-RS is used for CQI measurement of adjacent cells not only of the serving cell, in consideration of transmission/reception of data channel signals with CoMP (Coordinated Multiple Point). The CSI-RS is specified by parameters such as a position, a sequence and a transmission power like the CRS. Out of these parameters, the CSI-RS position is now under study as to whether it is determined by a broadcast signal of each cell or by association with a cell ID. Here, for convenience of explanation, it is assumed that out of the other parameters, the sequence of the CSI-RS is associated with the cell ID and the transmission power is notified of by a broadcast signal.

In the event that the CSI-RS position is specified by the broadcast signal, the mobile terminal apparatus specifies the CSI-RS position upon receiving the broadcast signal from the base station apparatus. For example, as illustrated in FIG. 2, there are twelve CSI-RS arrangement patterns defined per resource block in the base station apparatus, and a pattern index of each pattern is included in the broadcast signal, which is then sent to the mobile terminal apparatus. If the CSI-RS is arranged in a resource indicated by the pattern index #0, the mobile terminal apparatus is notified of the pattern index #0 by a broadcast channel and thereby, the mobile terminal apparatus specifies the position of the CSI-RS.

In this case, as the resource where the CSI-RS is arranged is not associated with the cell ID, the cell ID can be designed irrespective of the CSI-RS arrangement. That is, the cell ID is designed in consideration of the parameters of the CRS arrangement and the like, but not of the CSI-RS parameters thereby to prevent complexity. Therefore, designation of the CSI-RS position by broadcasting is advantageous if the system design flexibility is given a higher priority. However, as the CSI-RS position information (pattern index) is contained in the broadcast signal to be sent to the mobile terminal apparatus, there is a problem of increase in signaling overhead.

On the other hand, in the event that the CSI-RS position is associated with the cell ID, the mobile terminal apparatus specifies the CSI-RS position by recognizing the cell ID of the serving cell. For example, in the base station apparatus, there are twelve CSI-RS arrangement patterns designed per resource block, and each of the patterns is associated with the cell ID. Then, the mobile terminal apparatus recognizes the cell ID of the serving cell thereby to specify the arrangement pattern. Specifically, the following equation (1) is used in the mobile terminal apparatus to determine the arrangement pattern.

$$\text{Pattern index} = \text{Mod}(\text{cell-id}, \text{number of pattern}) \quad (1)$$

The equation (1) expresses a pattern index as a remainder obtained by dividing the cell ID by the total number of the arrangement patterns. For example, it is assumed that the base station apparatus uses the cell ID=15, and the CSI-RS is arranged in the resource indicated by the pattern index #3 associated with the cell ID=15. The mobile terminal apparatus recognizes the cell ID=15 by cell search and uses the equation (1) Mod(15, 12) to determine the pattern index #3. In this way, the mobile terminal apparatus specifies the CSI-RS arranged in the resource indicated by the pattern index #3.

In this case, the base station apparatus does not need to notify the mobile terminal apparatus of the pattern index contained in the broadcast signal. Accordingly, it is possible to prevent increase in the signaling overhead. Therefore, designation of the CSI-RS position by association with the cell ID is advantageous if the reduction in signaling overhead in the system is given a higher priority. However, as the CSI-RS arrangement is associated with the cell ID, there is a problem of complexity such that the cell ID needs to be designed in consideration of the CSI-RS parameters as well as CRS parameters. Thus, there is a trade-off relationship between designation of the CSI-RS position by a broadcast signal and designation of the CSI-RS position by association with a cell ID.

Then, in view of these problems, the present inventors have achieved the preset invention. That is, noting that there is a trade-off relationship between designation of the CSI-RS position by a broadcast signal and designation of the CSI-RS position by association with a cell ID, the gist of the present invention is to make the method of designating the CSI-RS position selectable in accordance with the system configuration.

Figure 3:
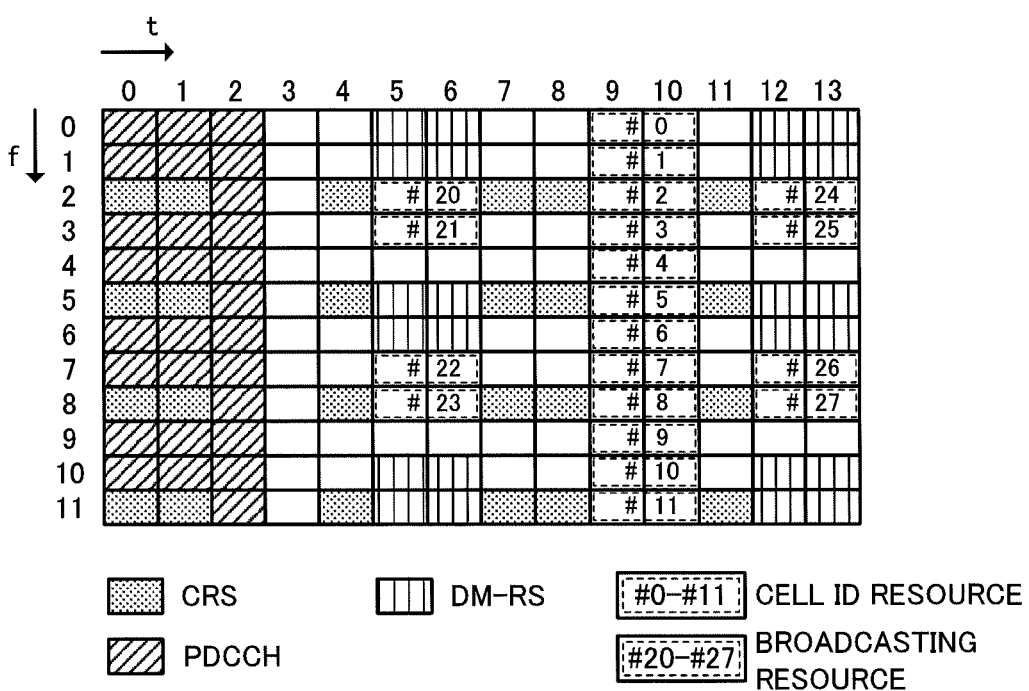
FIG. 3 is an explanatory view of the CSI-RS arrangement in a communication control method according to the present invention.

Next, with reference to FIG. 3, the communication control method of the present invention will be described below. FIG. 3 is an explanatory view of the CSI-RS arrangement in the communication control method according to an embodiment of the present invention.

As illustrated in FIG. 3, in the resource block of the downlink, there are resources reserved for broadcasting (hereinafter referred to as "broadcasting resources") and resources associated with cell IDs (hereinafter referred to as "cell ID resources") prepared for resources where the CSI-RSs are arranged. The broadcasting resources are used when the base station apparatus notifies the mobile terminal apparatus of the CSI-RS position by a broadcast signal. The broadcasting resources are separated in the frequency domain from resources where DM-RSs are arranged. In the base station apparatus, the pattern indices #20-#27 are defined as representing arrangement patterns of the broadcasting resources.

The cell ID resources are used when the mobile terminal apparatus obtains the CSI-RS position from the cell ID of the serving cell. The cell ID resources are prepared consecutively in the frequency domain. In the base station apparatus, the pattern indices #00 to #11 are defined as representing arrangement patterns of the cell ID resources. Here, each of the broadcasting resources and the cell ID resources consists of one subcarrier x consecutive two symbols. However, the resource size is not limited to this, but may be set flexibly such as two subcarriers x consecutive two symbols.

Here, the broadcasting resources and the cell ID resources are arranged to be shifted in the time domain from the resources where the CRSs are arranged. This is for the purpose of preventing overlapping of the CRS and CSI-RS resources since the CRSs are shifted in the frequency domain in accordance with the cell IDs.

The base station apparatus determines whether the CSI-RS is arranged in either the broadcasting resource or the cell ID resource, in accordance with the system configuration. A determination result of the base station apparatus is contained in a broadcast signal as an identification bit (identification information), which is transmitted to the mobile station apparatus. For example, when the CSI-RS is arranged in a broadcasting resource, the identification bit is "0" and when the CSI-RS is arranged in a cell ID resource, the identification bit is "1". And, when the identification bit is "0", it is added with index bits which represent the pattern index of the broadcasting resource.

Then, upon obtaining the identification bit via the broadcast signal, the mobile terminal apparatus recognizes whether the CSI-RS is arranged in the broadcasting resource or the cell ID resource. When the identification bit is "0", the mobile terminal apparatus recognizes that the CSI-RS is arranged in the broadcasting resource. Then, the mobile terminal apparatus specifies the pattern index of the broadcasting resource where the CSI-RS is arranged from the index bits added to the identification bit and obtains the CSI-RS from the resource indicated by the pattern index thereby to perform CQI measurement.

In the meantime, when identification bit is "1", the mobile terminal apparatus recognizes that the CSI-RS is arranged in the cell ID resource. Then, the mobile terminal apparatus specifies the pattern index of the cell ID resource where the CSI-RS is arranged from the cell ID obtained by cell search and the above-described equation (1), and obtains the CSI-RS from the resource indicated by the pattern index thereby to perform CQI measurement.

In this way, in the present embodiment, both of designation of the CSI-RS position by a broadcast signal and designation of the CSI-RS position by association with a cell ID are supported. In other words, the CSI-RS arrangement is selectable in accordance with the system configuration in such a manner that if priority is given to system design flexibility rather than reduction in signaling overhead, the CSI-RS is arranged in a broadcasting resource and if priority is given to reduction in signaling overhead rather than the system design flexibility, the CSI-RS is arranged in a cell ID resource.

Besides, when CoMP (Coordinated Multiple Point) is performed and the same cell ID is used in plural cells, CSI-RSs are arranged in a cell ID resource and there is a conflict of the CSI-RSs between the cells. Accordingly, in such a system configuration, the CSI-RS is arranged in a broadcasting resource. Further, whether the CSI-RS is arranged in a broadcasting resource or a cell ID resource may be determined in the following manner. That is, in a macrocell, the CSI-RS is arranged in a cell ID resource, while, in a pico cell, the CSI-RS is arranged in a broadcasting resource.

Further, in the present embodiment, the base station apparatus is configured to notify the mobile terminal apparatus of a pattern index as the CSI-RS position information. However, this structure is by no means limiting. The CSI-RS position information may be any one that represents the position of the CSI-RS, for example, address information in the resource block.

Further, unlike CQI measurement using the CRS, CQI measurement using the CSI-RS is performed on adjacent cells not only on the serving cell. This measurement of channel quality of plural cells is performed for consideration of transmission and reception of user data by CoMP. The mobile terminal apparatus feeds measured CQI back to the base station apparatus of the serving cell and base station apparatuses of the adjacent cells. The CQI fed back to the base station apparatus is used to determine a parameter (for example, MCS (Modulation and Coding Scheme)) for transmitting user data to the mobile terminal apparatus.

Figure 4:
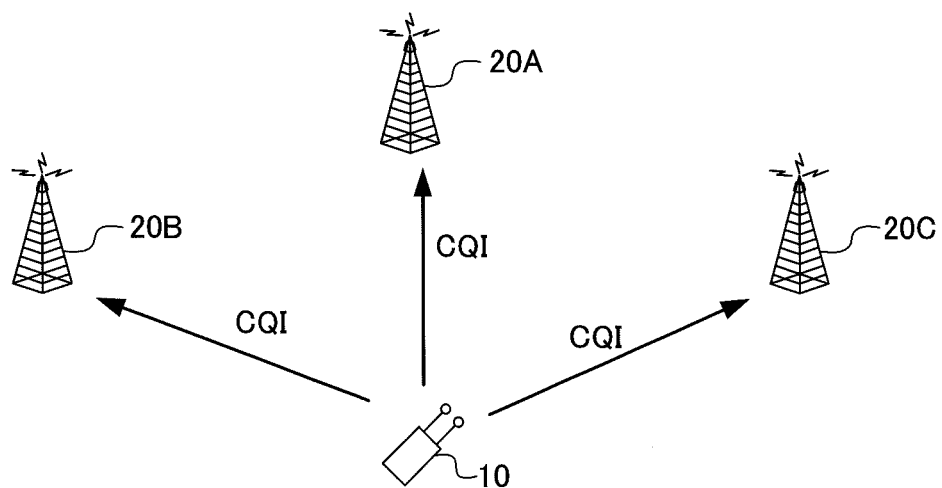
FIG. 4 is an explanatory view of the method for measuring a CQI of an adjacent cell.

In this case, the CSI-RS parameter is communicated between the cells and the CSI-RS parameters such as position and transmission power of the adjacent cells are sent from the serving cell to the mobile terminal apparatus. Here, with reference to FIG. 4, description is made about CQI measurement of the adjacent cells. FIG. 4 is an explanatory view of the method for measuring CQI of an adjacent cell according to the embodiment of the present invention.

As illustrated in FIG. 4, a base station apparatus 20A installed in a serving cell is connected to base station apparatuses 20B and 20C installed in adjacent cells respectively so as to be able to transmit/receive CSI-RS parameters. The connecting pattern of the base station apparatuses 20A, 20B and 20C is by no means limiting and may be either priority connection of wireless connection. In this system, the CSI-RS parameters such as position, sequence and transmission power are transmitted from the base station apparatuses 20B and 20C of the adjacent cells to the base station apparatus 20A of the serving cell. The base station apparatus 20A generates a broadcast signal including CSI-RS parameters received from the base station apparatuses 20B and 20C and the CSI-RS parameters of the it's own cell, and transmits the resultant signal to the mobile terminal apparatus.

The CSI-RS parameters in the serving cell include a position, a sequence and transmission power of CSI-RS. If the CSI-RS position is associated with the cell ID, the CSI-RS position is not included in the CSI-RS parameters. And, the CSI-RS parameters of the adjacent cells include the adjacent cell IDs, CSI-RS positions, sequences and transmission power. The mobile terminal apparatus 10 can specify the CSI-RS position, sequence and transmission power of each adjacent cell by the broadcast signal from the serving cell, and thereby the mobile terminal apparatus 10 measures a CQI of the adjacent cell.

Here, in the CQI measurement using the CSI-RS, muting is under study for the purpose of improving the CQI measurement accuracy by preventing interference from adjacent cells. In muting, resources where the CSI-RSs are arranged in the adjacent cells are set to be blank resources (null). With reference to FIGS. 5A and 5B, description is made below about muting in CQI measurement using a CSI-RS. FIGS. 5A and 5B are explanatory views of muting in CSI measurement using a CSI-RS according to the embodiment of the present invention. In FIGS. 5A and 5B, the cells C1, C2 and C3 are adjacent to each other. In the following description, it is assumed that the resource where the CSI-RS is arranged is a CSI-RS resource.

As illustrated in FIG. 5A, when muting is not performed, in the downlink resource block of the cell C1, user data is arranged in resources corresponding to the CSI-RS resources of the cells C2 and C3. And, in the downlink resource block of the cell C2, user data is arranged in resources corresponding to the CSI-RS resources of the cells C1 and C3. Further, in the downlink resource block of the cell C3, user data is arranged in resources corresponding to the CSI-RS resources of the cells C2 and C3. These user data pieces may be CSI-RS interference components in each cell and cause deterioration of estimation accuracy of channel quality in the mobile terminal apparatus.

In muting, in order to prevent the estimation accuracy of channel quality from being deteriorated due to such arranged user data, the resource corresponding to the CSI-RS resources of the adjacent cells are set to be blank resources and the user data is not arranged in these CSI-RS resources. As illustrated in FIG. 5B, in the downlink resource block of the cell C1, the resources corresponding to the CSI-RS resources of the cells C2 and C3 are set to be blank resources. Besides, in the downlink resource bock of the cell C2, the resources corresponding to the CSI-RS resources of the cells C1 and C3 are set to be blank resources. Further, in the downlink resource bock of the cell C3, the resources corresponding to the CSI-RS resources of the cells C1 and C2 are set to be blank resources.

In this way, as the resources corresponding to the CSI-RS resources of the adjacent cells are set to be blank resources, it is possible to prevent the user data of the adjacent cells from becoming interference components of the CSI-RSs and to improve the estimation accuracy of channel quality in the mobile terminal apparatus. However, when muting is performed, interference from adjacent cells is removed completely, which causes results of the CQI measurement by the mobile terminal apparatus to be apparently magnified as compared with actual measurement results. To cope with this situation, it is necessary to make the base station apparatus notify the mobile terminal apparatus of whether the muting is performed or not.

The mobile terminal apparatus recognizes presence or absence of the muting based on position information of the blank resources notified of from the base station apparatus and measures a CQI in consideration of the interference components of the resources subjected to muting thereby to be able to obtain an actual CQI value in CQI measurement. In this case, the mobile terminal apparatus specifies positions and transmission power values of the CSI-RSs of the cells C1 to C3 from the CSI-RS parameters, and thereby estimates transmission power values of the blank resources that are set in muting.

For this reason, in CQI measurement, it is possible to obtain CQI values corresponding to an actual CQI values by using signal powers of the blank resources. For example, a CQI can be calculated from the equation (2).

$$CQI = CSI\text{-}RS \text{ transmission power}/(\text{transmission powers of blank resources of other cells corresponding CSI-RS resources} + \text{noise}) \qquad (2)$$

Here, the transmission powers of blank resources of other cells corresponding to CSI-RS resources are obtained from the CSI-RS parameters transmitted/received between cells as mentioned above.

Figure 6B:
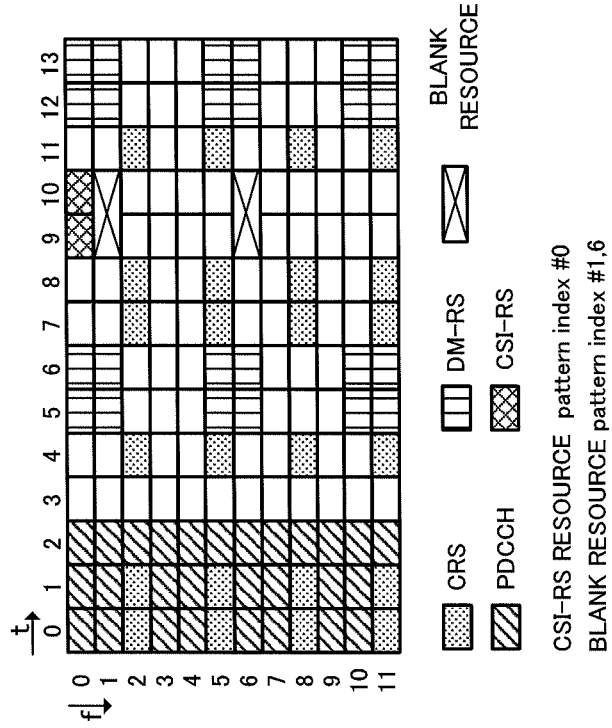
FIG. 6 provides diagrams for explaining a first muting notification method.
Figure 6A:
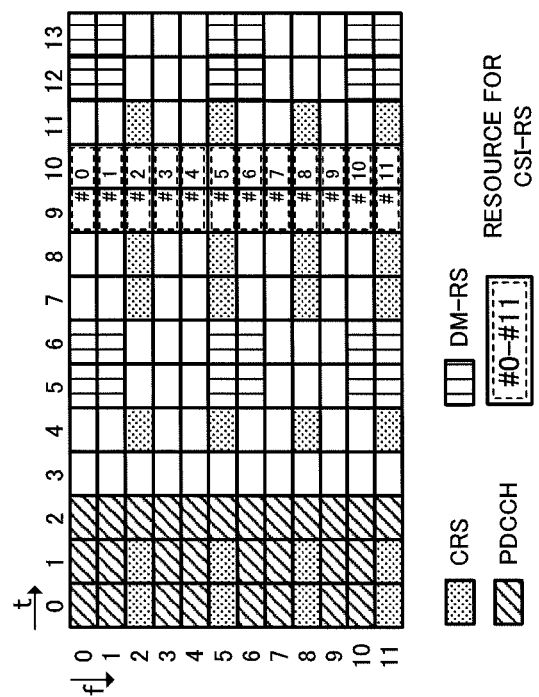
Figure 7A:
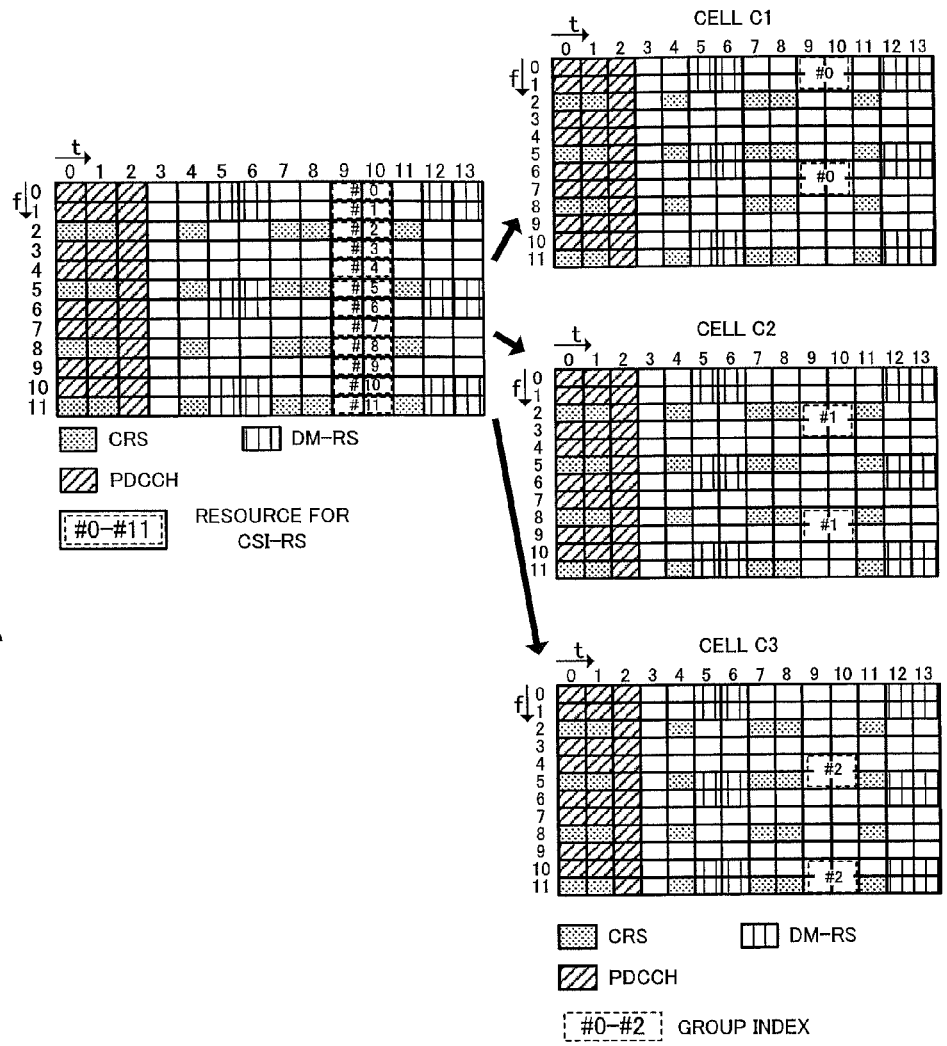
FIG. 7 provides diagrams for explaining a second muting notification method.
Figure 7B:
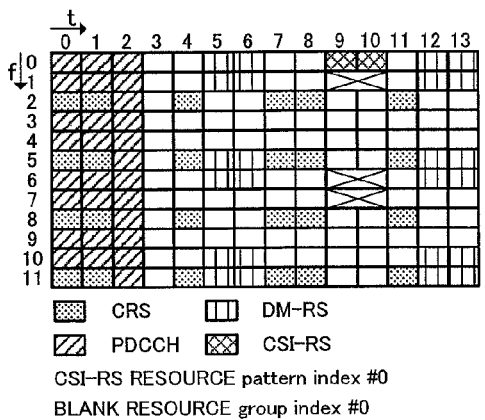

Next description is made, with reference to FIGS. 6A and 6B, about a muting notification method. FIGS. 6A and 6B are explanatory views of the first muting notification method according to the embodiment of the present invention. FIGS. 7A and 7B are explanatory views of the second muting notification method according to the embodiment of the present invention.

As illustrated in FIG. 6A, in the first muting notification method, the base station apparatus notifies the mobile terminal apparatus of position information of blank resources by a broadcast channel. For example, the base station apparatus defines pattern indices representing CSI-RS arrangement patterns in one resource block, and the base station apparatus notifies the mobile terminal apparatus of such a pattern index as position information.

As illustrated in FIG. 6B, for example, in the cell C1, the base station apparatus notifies the mobile terminal apparatus of the pattern index #0 as position information of a CSI-RS and of the pattern indices #1 and #6 as position information of blank resources. Upon being notified of the blank resources, the mobile terminal apparatus can demodulate user data while ignoring the blank resources. Thus, according to the first muting notification method, it is possible to notify the mobile terminal apparatus of the blank resources by a simple structure.

Here, the present embodiment has been described by way of example where the base station apparatus notifies the mobile terminal apparatus of pattern indices as position information of blank resources, however, this structure is by no means limiting. The position information of the blank resources may be any information that allows the position of the blank resources to be specified and, for example, it may be address information in the resource block. In addition, where there are pattern indices defined in a resource block as representing arrangement patterns of cell ID resources, a cell ID may be notified of as position information of the blank resources.

As illustrated in FIG. 7A, in the second muting notification method, in the base station apparatus, resources prepared for CSI-RS arrangement are grouped and each group is given a group index (group indicator). For example, the resources indicated by the pattern indices #0, #1, #6 and #7 are given a group index #0. And, the resources indicated by the pattern indices #2, #3, #8 and #9 are given a group index #1. Further, the resources indicated by the pattern indices #4, #5, #10 and #11 are given a group index #2.

The base station apparatus notifies the mobile terminal apparatus of this group index as position information of blank resources and makes the mobile terminal apparatus estimate that other resources belonging to the same group as the resource where the CSI-RS is arranged are blank resources. As illustrated in FIG. 7B, for example, when the base station apparatus notifies the mobile terminal apparatus of the pattern index #0 and the group index #0, the mobile terminal apparatus recognizes that the CSI-RS is arranged in a resource indicated with the pattern index #0 and the resources indicated with the #1, #6 and #7 are blank resources.

In this case, in a downlink resource block, grouping is performed in such a manner that adjacent cells are of the same group. Accordingly, the CSI-RS resource of an own cell and the blank resources corresponding to the CSI-RS resources of the adjacent cells belong to the same group. Therefore, the mobile terminal apparatus can specify the blank resources by receiving the group index from the base station apparatus. Upon receiving the group index, the mobile terminal apparatus can demodulate user data without considering the blank resources.

Here, grouping is not limited to the structure where adjacent cells are of the same group, and may be arranged flexibly in accordance with the system configuration. Thus, according to the second muting notification method, there is no need to notify of position information of each of the blank resources individually, and it is possible to reduce signaling overhead.

Here, in the first and second muting notification methods, the positions of CQI-RSs in adjacent cells (positions of blank resources in the own cell) may be transmitted/received between cells as a CSI-RS parameter as described above, or may be fixed between cells.

Figure 8:
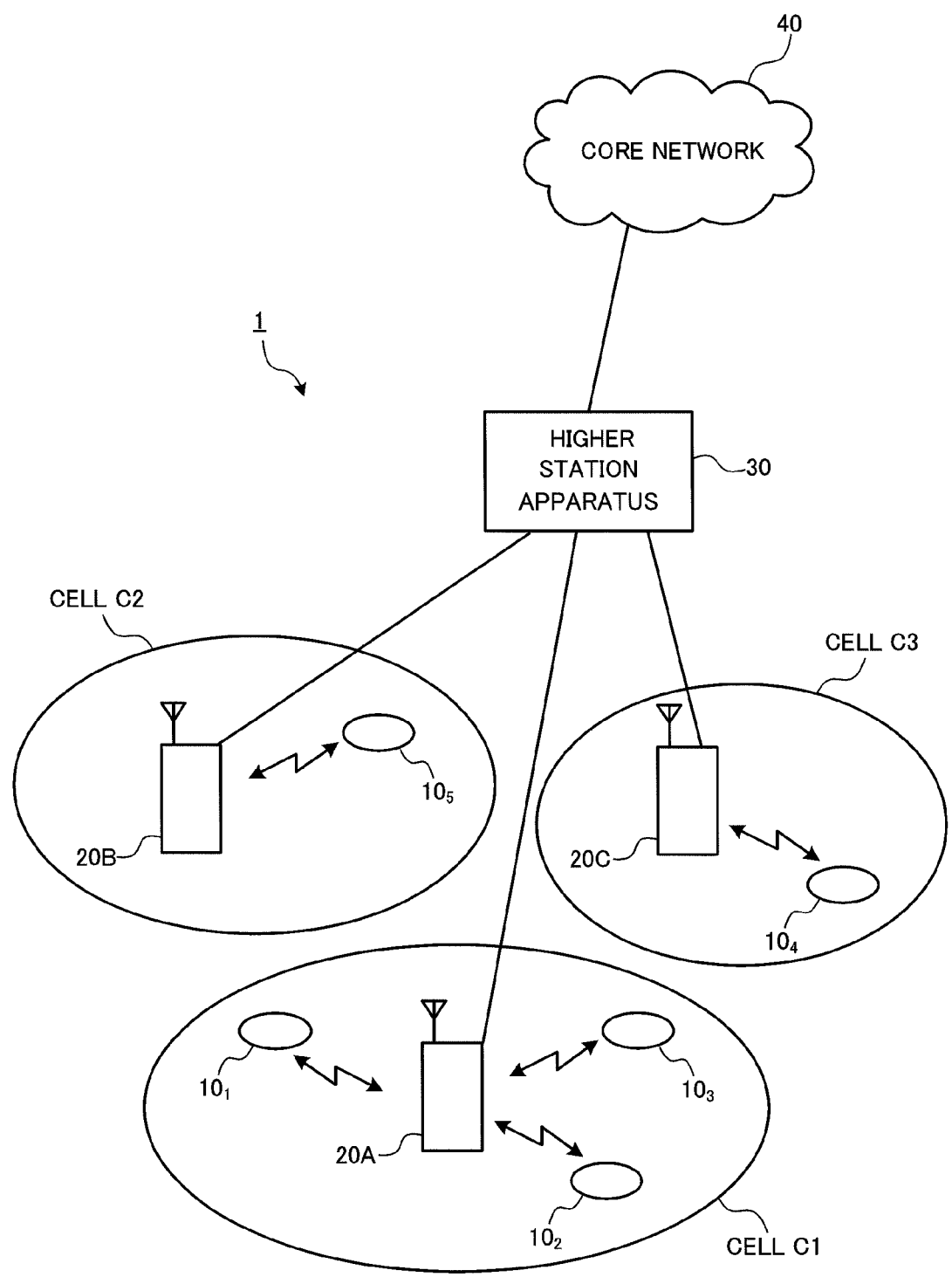
FIG. 8 is a diagram for explaining a system configuration of the mobile communication system.

Here, description is made about a radio communication system according to an embodiment of the present invention. FIG. 8 is an explanatory view of a system configuration of the radio communication system according to the present embodiment. Here, the radio communication system illustrated in FIG. 8 is, for example, an LTE system or a system including SUPER 3G. In this radio communication system, carrier aggregation is used such that plural fundamental frequency blocks are aggregated into one band, each fundamental frequency block corresponding to the system band of the LTE system. Besides, this radio communication system may be called IMT-Advanced or 4G.

As illustrated in FIG. 8, the radio communication system has base station apparatuses 20A, 20B and 20C and a plurality of mobile terminal apparatuses 10 ($10_1$, $10_2$, $10_3$, ..., $10_n$, n is an integer greater than 0) which communicate with the base station apparatuses 20A, 20B and 20C. The base station apparatuses 20A, 20B and 20C are connected to a higher station apparatus 30, which is connected to a core network 40. Each mobile terminal apparatus 10 can communicate with the base station apparatuses 20A, 20B and 20C in the cells C1, C2 and C3, respectively. The higher station apparatus 30 includes, for example, an access gateway apparatus, a radio network controller (RNC), a mobility management entity (MME) and so on, but is by no means limited to these.

The mobile terminal apparatuses ($10_1$, $10_2$, $10_3$, ..., $10_n$) includes LTE terminals and LTE-A terminals. In the following description, these are treated collectively as a mobile terminal apparatus 10, unless specified otherwise. Besides, for convenience of explanation, it is assumed that the mobile terminal apparatus 10 performs radio communications with the base station apparatuses 20A, 20B and 20C, but more generally, the mobile terminal apparatus 10 may be user equipment (UE) including a mobile terminal apparatus and a fixed terminal apparatus.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

Here, description is made about a communication channel in the LTE system.

The downlink communication channel includes a PDSCH (Physical Downlink Control CHannel), which is a downlink data channel used by each mobile terminal apparatus 10 on a shared basis, and downlink L1/L2 control channel (PDCCH, PCFICH (Physical Control Format Indicator CHannel), PHICH). PDSCH is used to transmit higher control information and transmission data. PDCCH is used to transmit scheduling information of PUSCH and PDSCH and the like. PCFICH is used to transmit OFDM symbol number used in PDCCH. PHICH is used to transmit ACK/NACK of HARQ for the PUSCH.

The uplink communication channels include a PUSCH, which is an uplink data channel used by each mobile terminal apparatus on a shared basis, and a PUCCH (Physical Uplink Control Channel), which is an uplink control channel. This PUSCH is used to transmit transmission data and higher control information. Furthermore, the PUCCH is used to transmit downlink channel quality information (CQI: Channel Quality Indicator), ACK/NACK, and so on.

Figure 9:
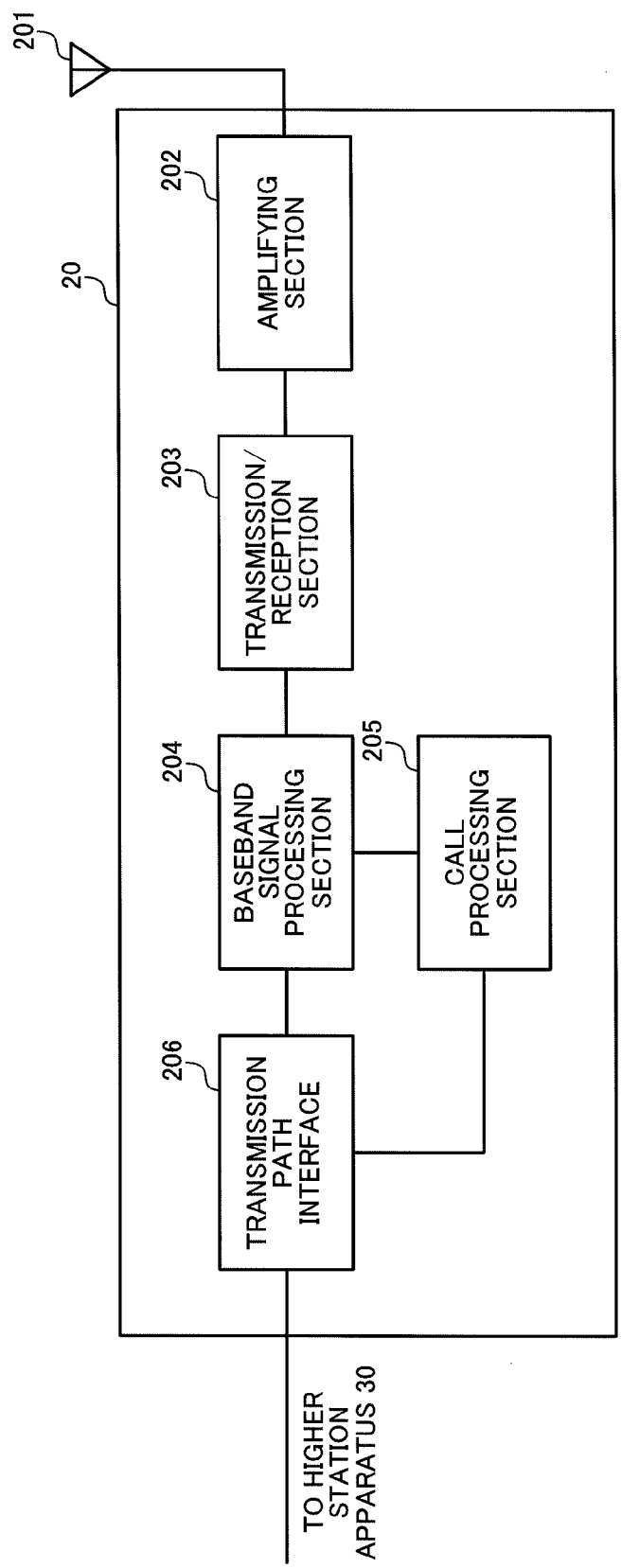
FIG. 9 is a diagram for explaining an overall configuration of the base station apparatus.

With reference to FIG. 9, an overall configuration of the base station apparatus according to the present embodiment will be described. Here, as the base station apparatuses 20A, 20B and 20C are the same in structure, they are treated collectively as the base station apparatus 20. The base station apparatus 20 has a transmitting/receiving antenna 201, an amplifying section 202, a transmission/reception section (transmission section) 203, a baseband signal processing section 204, a call processing section 205 and a transmission path interface 206. Transmission data that is transmitted on the downlink from the base station apparatus 20 to the mobile terminal apparatus 10 is input into the baseband signal processing section 204, through the transmission path interface 206, from the higher station apparatus 30.

In the baseband signal processing section 204, a downlink data channel signal is subjected to PDCP layer processing, RLC (Radio Link Control) layer transmission processing such as RLC retransmission control transmission processing and division and coupling of transmission data, MAC (Medium Access Control) retransmission control, including, for example, HARQ transmission processing, scheduling, transport format selection, channel coding, inverse fast fourier transform (IFFT) processing, and precoding processing. Furthermore, as with signals of the physical downlink control channel, which is a downlink control channel, transmission processing is performed, including channel coding and inverse fast Fourier transform.

Also, the baseband signal processing section 204 notifies the mobile terminal apparatuses 10 connected to the same cell of control information for allowing each of the mobile terminal apparatuses 10 to communicate with the base station apparatus 20, by a broadcast channel. Broadcast information for communication in this cell includes, for example, the uplink or downlink system bandwidth, identification information of a root sequence (root sequence index) for generating random access preamble signals in the PRACH (Physical Random Access CHannel), and so on.

In the transmission/reception section 203, the baseband signal output from the baseband signal processing section 204 is subjected to frequency conversion processing into a radio frequency band. The amplifying section 202 amplifies the transmission signal having been subjected to frequency conversion, and outputs the result to the transmitting/receiving antenna 201.

Meanwhile, as for signals to be transmitted on the uplink from the mobile terminal apparatus 10 to the base station apparatus 20, a radio frequency signal that is received in the transmitting/receiving antenna 201 is amplified in the amplifying section 202, subjected to frequency conversion and converted into a baseband signal in the transmission/reception section 203, and is input to the baseband signal processing section 204.

The baseband signal processing section 204 performs FFT processing, IDFT processing, error correction decoding, MAC retransmission control reception processing, and RLC layer and PDCP layer reception processing on the transmission data included in the baseband signal that is received on the uplink. The decoded signal is transferred to the higher station apparatus 30 through the transmission path interface 206.

The call processing section 205 performs call processing such as setting up and releasing a communication channel, manages the state of the base station apparatus 20 and manages the radio resources.

Figure 10:
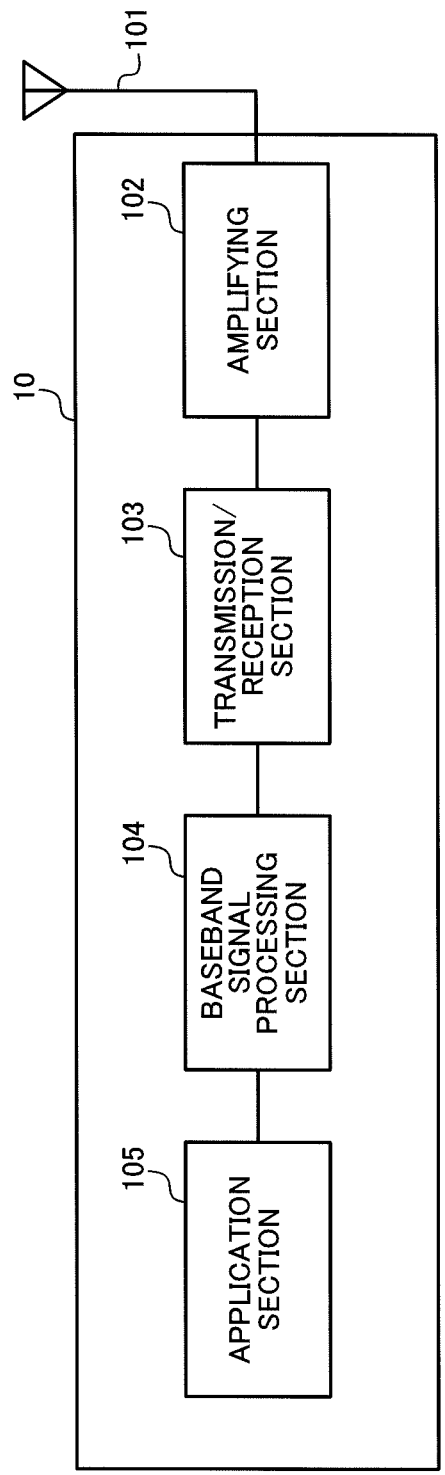
FIG. 10 is a diagram for explaining an overall configuration of the mobile terminal apparatus.

Next, referring to FIG. 10, an overall configuration of the mobile terminal apparatus 10 according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmission/reception section (reception section) 103, a baseband signal processing section 104 and an application section 105.

As for downlink data, a radio frequency signal received in the transmitting/receiving antenna 101 is amplified in the amplifying section 102, and subjected to frequency conversion and converted into a baseband signal in the transmission/reception section 103. This baseband signal is subjected to reception processing such as FFT processing, error correction decoding and retransmission control and so on, in the baseband signal processing section 104. In this downlink data, downlink transmission data is transferred to the application section 105. The application section 105 performs processing related to higher layers above the physical layer and the MAC layer. In the downlink data, broadcast information is also transferred to the application section 105.

On the other hand, uplink transmission data is input from the application section 105 to the baseband signal processing section 104 by maximum two transport blocks. In the baseband signal processing section 104, mapping processing to each layer of the transport blocks, retransmission control (HARQ) transmission processing, channel coding, DFT processing, IFFT processing and so on are performed. The baseband signal output from the baseband signal processing section 104 is subjected to frequency conversion processing in the transmission/reception section 103 and converted into a radio frequency band, and, after that, amplified in the amplifying section 102 and transmitted from the transmitting/receiving antenna 101.

Figure 11:
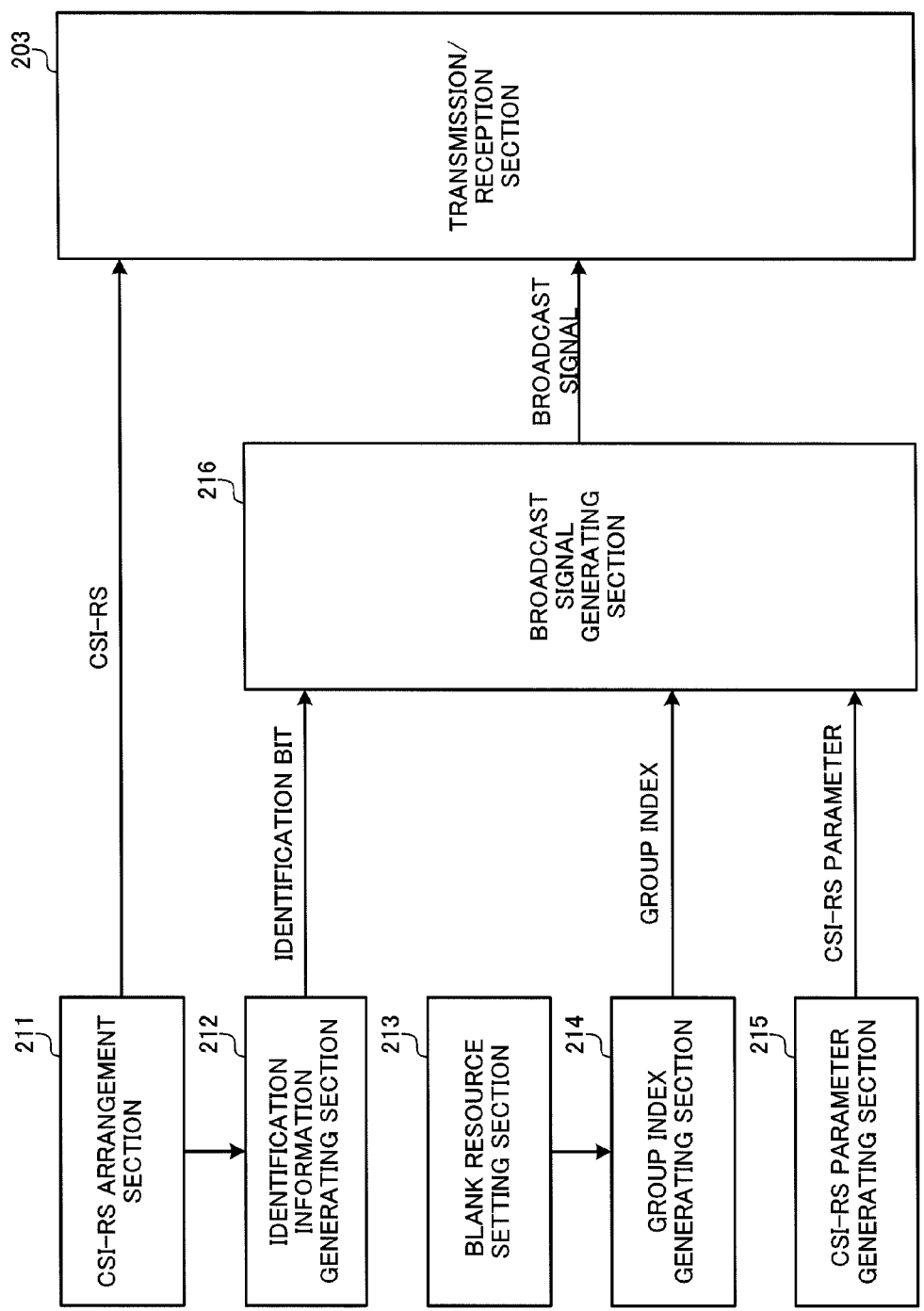
FIG. 11 is a diagram for explaining functional blocks of the base station apparatus to make the mobile terminal apparatus perform CQI measurement.

With reference to FIG. 11, description is made about functional blocks for the base station apparatus to make the mobile terminal apparatus perform CQI measurement. FIG. 11 is an explanatory view of the functional blocks for the base station apparatus to make the mobile terminal apparatus perform CQI measurement. Here, the functional blocks shown in FIG. 11 represent processing substantially performed in the baseband signal processing section. And, the functional blocks shown in FIG. 11 are simplified for explanation of the present invention, and needless to say, the baseband signal processing section is equipped with standard parts. Further, in the following description, it is assumed that the second muting notification method is employed.

As illustrated in FIG. 11, the base station apparatus 20 has a CSI-RS arrangement section (arrangement section) 211, an identification information generating section 212, a blank resource setting section 213, a group index generating section (group identifier generating section) 214, a CSI-RS parameter generating section 215, a broadcast signal generating section 216 and the transmission/reception section 203. The CSI-RS arrangement section 211 arranges a CSI-RS in a broadcasting resource or cell ID resource. The identification information generating section 212 generates an identification bit for identifying whether the CSI-RS is arranged the broadcasting resource or cell ID resource.

The identification bit is set to "0" when the CSI-RS is arranged in the broadcasting resource or to "1" when the CSI-RS is arranged in the cell ID resource. Then, when the identification bit is "0", it is added with index bits indicating a pattern index (position information) of the CSI-RS arranged in the broadcasting resource. The identification bit generated by the identification information generating section 212 is input to the broadcast signal generating section 216.

The blank resource setting section 213 sets, in muting, resources corresponding to CSI-RS resources where CSI-RSs are arranged in adjacent cells to be blank resources. In the present embodiment, the blank resources may be resources allocated with no data or may be resources allocated with some data to the extent that no interference is given to the CSI-RSs in the adjacent cells. Furthermore, the blank resources may be resources transmitted with such transmission power that does not cause interference to the CSI-RSs of the adjacent cells.

The group index generating section 214 generates a group index as position information of a blank resource. The broadcasting resources or cell ID resources where CSI-RSs are arranged are divided into a plurality of groups in such a manner that adjacent cells belong to one group, and each group is assigned with a group index. Accordingly, the group index generating section 214 can generate a group index for the one group covering CSI-RS resource for the own cell and blank resources corresponding to CSI-RS resources of the adjacent cells. When this group index is communicated to the mobile terminal apparatus 10, the mobile terminal apparatus 10 recognizes that the resources other than the CSI-RS resource are blank resources.

The group index generated by the group index generating section 214 is input to the broadcast signal generating section 216. Here, the position information of the blank resources may be notified of by communicating the position of each blank resource to the mobile terminal apparatus 10 instead of by communicating the group index to the mobile terminal apparatus 10. In this case, the blank resource setting section 213 inputs, as the position information of each blank resource, a pattern index indicating the position of the blank resource to the broadcast signal generating section 216.

The CSI-RS parameter generating section 215 generates CSI-RS parameters such as sequence and transmission power, other than CSI-RS position. Here, if the CSI-RS position is specified by broadcasting and the CSI-RS position information is not added to the identification bit in the identification information generating section 212, the CSI-RS parameter generating section 215 may generate the CSI-RS position (pattern index or the like) in addition to the CSI-RS sequence and transmission power. Out of these parameters, parameters communicated to the mobile terminal apparatus 10 by a broadcast signal are input to the broadcast signal generating section 216.

The broadcast signal generating section 216 generates the broadcast signal containing the identification bit, the group index, the CSI-RS parameters and the like. In this case, the broadcast signal generated by the broadcast signal generating section 216 contains not only the CSI-RS parameters of the own cell but also CSI-RS parameters of the adjacent cells which are received via the transmission/reception section 203. The transmission/reception section 203 transmits the broadcast signal and CSI-RS to the mobile terminal apparatus 10.

Figure 12:
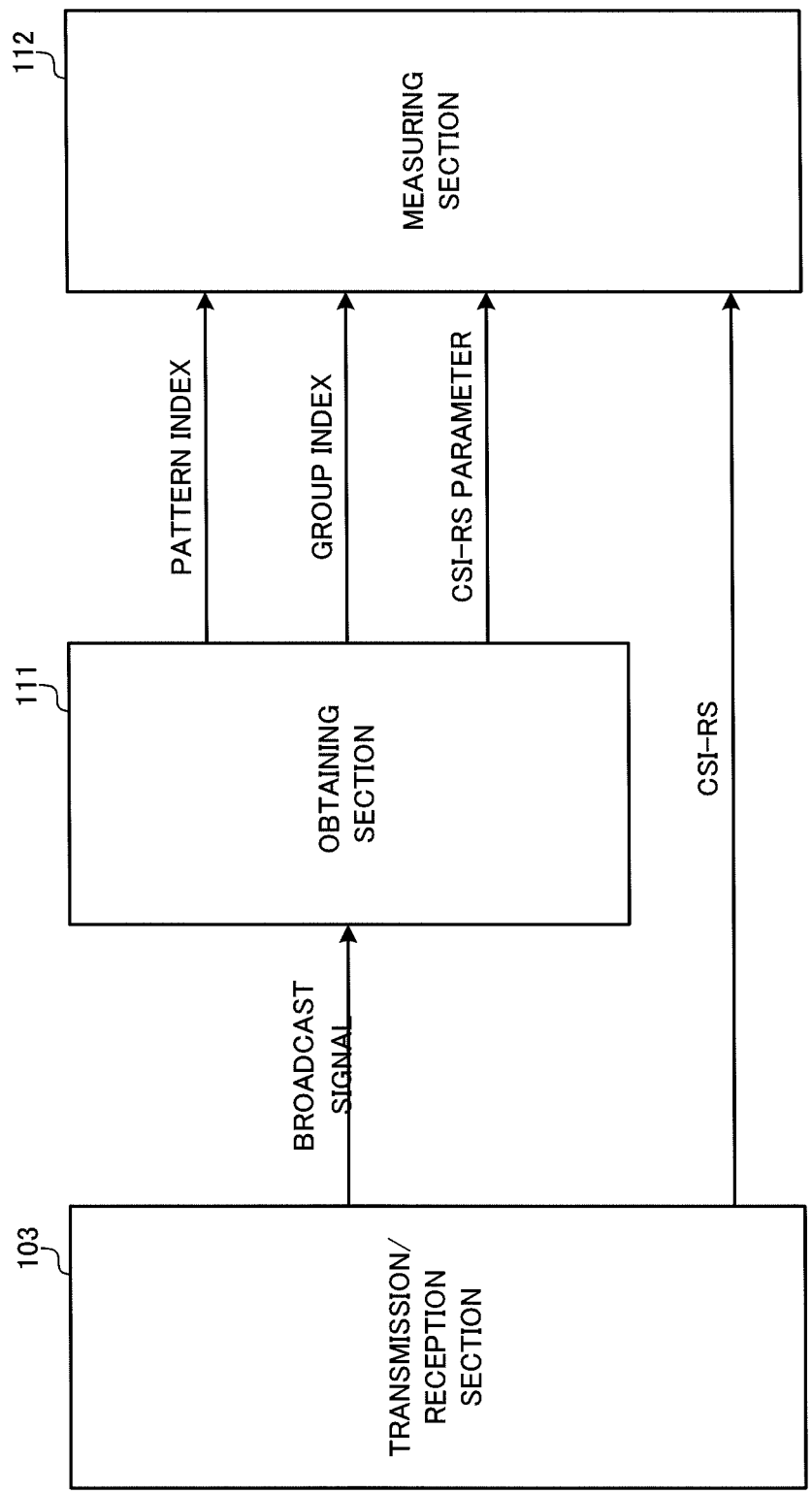
FIG. 12 is a diagram for explaining functional blocks of the mobile terminal apparatus for CQI measurement.

With reference to FIG. 12, description is made about functional blocks of the mobile terminal apparatus for CQI measurement. FIG. 12 is an explanatory view of the functional blocks of the mobile terminal apparatus for CQI measurement. Here, the functional blocks shown in FIG. 12 represent processing substantially performed in the baseband signal processing section. And, the functional blocks shown in FIG. 12 are simplified for explanation of the present invention, and needless to say, the baseband signal processing section is equipped with standard parts. Further, in the following description, it is assumed that the second muting notification method is employed.

As illustrated in FIG. 12, the mobile terminal apparatus has the transmission/reception section 103, an obtaining section 111 and a measuring section 112. The transmission/reception section 103 receives the broadcast signal and CSI-RS from the base station apparatus 20. The obtaining section 111 demodulates the broadcast signal and analyzes the signal thereby to obtain the CSI-RS parameters such as transmission power and position information and the position information of the blank resources. The obtaining section 111 reads the identification bit from the broadcast signal and identifies whether the CSI-RS is arranged in the broadcasting resource or cell ID resource.

When the identification bit is "0", the obtaining section 111 determines that the position information of the CSI-RS is notified of by the broadcast signal and obtains the position information of the CSI-RS (pattern index) from the index bits added to the identification bit. On the other hand, when the identification bit is "1", the obtaining section 111 determines that the position information of the CSI-RS is associated with a cell ID, and obtains the position information of the CSI-RS (pattern index) with use of the cell ID recognized by cell search.

Further, the obtaining section 111 obtains parameters such as transmission power other than the position of the CSI-RS contained in the broadcast signal. Further, the obtaining section 111 obtains the group index contained in the broadcast signal. The CSI-RS parameters and group index are input to the measuring section 112. The measuring section 112 measures CQIs based on the CSI-RS parameters of the serving cell and the adjacent cells. In the measuring section 112, the CQIs of the serving cell and adjacent cells are calculated from the CSI-RS parameters such as position, sequence, transmission power and the like.

Furthermore, the measuring section 112 measures a CQI in consideration of interference components of the muted resources. In this case, the measuring section 112 recognizes that all the resources other than the CSI-RS resources in all the cells belonging to the same group indicated with the group index are blank resources. Therefore, assuming that the resource corresponding to the CSI-RS resource in the serving cell is set to be a blank resource in the other cells, the measuring section 112 measures the CQI in consideration of the interference components of the blank resources. The CQI is measured, for example, from CSI-RS parameters of the serving cell and adjacent cells, with use of the equation (2). Besides, in the mobile terminal apparatus 10, demodulation of user data is performed ignoring the blank resources.

As described above, according to the base station apparatus 20 according to the present embodiment, if arrangement of the CSI-RS in the broadcasting resource is selected, the CSI-RS arrangement is not affected by cell ID design. On the other hand, if arrangement of the CSI-RS in the cell ID resource is selected, the mobile terminal apparatus 10 obtains position information of the CSI-RS from the cell ID of the serving cell thereby to eliminate signaling of the position information of the CSI-RS. Accordingly, if the system design flexibility is given a higher priority, the CSI-RS is arranged in the broadcasting resource, and if reduction in signaling overhead in the system is given a higher priority, the CSI-RS is arranged in the cell ID resource. Thus, it is possible to choose the CSI-RS arrangement flexibly in accordance with the system configuration.

In the above-described embodiment, it is assumed that the CSI-RS is arranged in the broadcasting resource or in the cell ID resource. However, this is by no means limiting. The CSI-RS may be arranged in a sector ID resource associated with a sector instead of the cell ID resource.

Besides, in the above-described embodiment, grouping is performed in such a manner that plural adjacent cells are of one group, however, this is by no means limiting. Plural adjacent sectors may be of one group.

Further, in the above-described embodiment, the muting notification method is applied when identification information to identify whether the CSI-RS is arranged in the broadcasting resource or the cell ID resource is communicated to the mobile terminal apparatus, however, this is by no means limiting. The muting notification method may be applied not only when the identification information is communicated to the mobile terminal apparatus but also when the CSI-RS is utilized.

Furthermore, in the above-described embodiment, when the CSI-RS is arranged in the broadcasting resource, the base station apparatus communicates position information of the CSI-RS simultaneously to plural mobile terminal apparatuses by broadcast signals, however, this is by no means limiting. The base station apparatus may communicate the CSI-RS to the plural mobile terminal apparatuses independently instead of communicating the CSI-RS by the broadcast signals. Therefore, the broadcasting resource is not limited to one used when the position information of the CSI-RS is communicated simultaneously to mobile terminal apparatuses by broadcast signals, and may be used when the position information of the CSI-RS is communicated to the mobile terminal apparatuses independently.

Still furthermore, in the above-described embodiment, in the mobile terminal apparatus, the obtaining section obtains position information of a blank resource from a broadcast signal, however, this is by no means limiting. The position information of the blank resource may be obtained by any functional block other than the obtaining section, or for example, by the measuring section.

The present invention is not limited to the above-described embodiment and may be embodied in various modified forms. For example, the above-described CSI-RS assignment position, the number of processing sections, processing procedure, the number of CSI-RSs may be modified as appropriate without departing of the range of the present invention. Other modifications may be also made as appropriate without departing of the range of the present invention.

As described above, this description covers the following inventive ideas (1) to (7):

(1) A radio station apparatus comprising:
an arrangement section configured to arrange a CSI-RS in a predetermined resource;
a blank resource setting section configured to set a resource where a CSI-RS is arranged in an adjacent area to be a blank resource; and
a transmission section configured to transmit position information of the CSI-RS as well as position information of the blank resource to a mobile terminal apparatus;

(2) The base station apparatus as defined in (1), characterized by further comprising a group identifier generating section configured to divide resources where CSI-RS is arrangeable into groups and to generate a group identifier for each of the groups, wherein the transmission section transmits the group identifier as the position information of the blank resource to the mobile terminal apparatus;

(3) The base station apparatus as defined in (2), characterized in that when the resources where the CSI-RS is arrangeable are associated with area identifiers, the group identifier generating section divides the resources associated with the area identifiers into the groups in such a manner that adjacent areas are of one group, and generates the group identifier to each of the groups;

(4) A mobile terminal apparatus comprising:
a reception section configured to receive position information of a CSI-RS and position information of a blank resource from a base station apparatus, the blank resource being a resource where the CSI-RS is arranged in an adjacent area;

(5) The mobile terminal apparatus as defined in (4), characterized in that
when resources where the CSI-RS is arrangeable are divided into groups, the reception section receives, as the position information of the blank resource, a group identifier that is generated to each of the groups, from the base station apparatus, and
any other resource which belongs to the same group as a resource where the CSI-RS is arranged is presumed to be set to be the blank resource;

(6) The mobile terminal apparatus as defined in (5), characterized in that when the resources where the CSI-RS is arrangeable are associated with area identifiers, the resources associated with the area identifiers are divided into the groups by the base station apparatus in such a manner that adjacent areas are of one group, and the reception section receives the group identifier generated to each of the groups from the base station apparatus; and (7) A communication control method comprising the steps of:
arranging a CSI-RS in a predetermined resource;
setting a resource where the CSI-RS is arranged in an adjacent area to be a blank resource; and
transmitting position information of the CSI-RS and position information of the blank resource to a mobile terminal apparatus.

The disclosure of Japanese Patent Application No. 2010-141017, filed on Jun. 21, 2010, including the specification, drawings, and abstract, is incorporated herein by reference in its entirety.

The invention claimed is:

1. A base station apparatus comprising:
an arrangement section configured to arrange a CSI-RS (Channel State Information-Reference Signal) in a resource reserved for broadcasting when a mobile terminal apparatus is notified of position information of the CSI-RS by broadcasting or in a resource associated with an area identifier of a serving area when the mobile terminal apparatus obtains the position information of the CSI-RS based on the area identifier;
an identification information generating section configured to generate identification information for identifying whether the CSI-RS is arranged in the resource reserved for broadcasting or in the resource associated with the area identifier; and
a transmission section configured to transmit the identification information to the mobile terminal apparatus.

2. The base station apparatus of claim 1, wherein when the CSI-RS is arranged in the resource reserved for broadcasting, the identification information generating section adds position information of the CSI-RS to the identification information.

3. The base station apparatus of claim 1, wherein the arrangement section arranges the CSI-RS in a resource that is shifted in a time domain from a resource where a CRS (Common Reference Signal) is arranged.

4. The base station apparatus of claim 1, wherein the resource reserved for broadcasting and the resource associated with the area identifier are set to be different in a time domain.

5. The base station apparatus of claim 1, wherein when the CSI-RS is arranged in the resource reserved for broadcasting, the transmission section transmits the position information of the CSI-RS to mobile terminal apparatuses simultaneously by a broadcast signal.

6. The base station apparatus of claim 1, wherein when the CSI-RS is arranged in the resource reserved for broadcasting, the transmission section transmits the position information of the CSI-RS to mobile terminal apparatuses independently by respective signals.

7. The base station apparatus of claim 1, wherein
the base station apparatus further comprises a blank resource setting section configured to set a resource where a CSI-RS is arranged in an adjacent area to be a blank resource, and
the transmission section transmits position information of the blank resource to the mobile terminal apparatus.

8. The base station apparatus of claim 7, wherein when the resource associated with the area identifier is set to be the blank resource, the transmission section transmits, as the position information of the blank resource, an area identifier of the adjacent area to the mobile terminal apparatus.

9. The base station apparatus of claim 7, wherein
the base station apparatus further comprises a group identifier generating section configured to divide resources where the CSI-RS is arrangeable into groups and to generate a group identifier for each of the groups, and
the transmission section transmits, as the position information of the blank resource, the group identifier to the mobile terminal apparatus.

10. The base station apparatus of claim 9, wherein the group identifier generating section divides resources associated with area identifiers into the groups in such a manner that adjacent areas are of one group, and generates the group identifier to each of the groups.

11. A mobile terminal apparatus comprising:

a reception section configured to receive identification information for identifying whether a CSI-RS (Channel State Information-Reference Signal) is arranged in a resource reserved for broadcasting of position information of the CSI-RS or in a resource associated with an area identifier from a base station apparatus; and an obtaining section configured to, when the CSI-RS is arranged in the resource reserved for broadcasting, obtain the position information of the CSI-RS by broadcasting from the base station apparatus and when the CSI-RS is arranged in the resource associated with the area identifier, obtains the position information of the CSI-RS based on the area identifier of a serving area.

12. The mobile terminal apparatus of claim 11, wherein when the CSI-RS is arranged in a resource reserved for broadcasting, the obtaining section obtains position information of the CSI-RS that is added to the identification information by the base station apparatus.

13. The mobile terminal apparatus of claim 11, wherein a resource where a CSI-RS is arranged in an adjacent area is set to be a blank resource, and the reception section receives position information of the blank resource from the base station apparatus.

14. The mobile terminal apparatus of claim 13, wherein when the resource associated with the area identifier is set to be the blank resource, the reception section receives, as the position information of the blank resource, an area identifier of the adjacent area from the base station apparatus.

15. The mobile terminal apparatus of claim 13, wherein the reception section receives, as the position information of the blank resource, a group identifier that is generated for each of groups, the groups being such that resources where the CSI-RS is arrangeable by the base station apparatus are grouped, and any other resource which belongs to the same group as a resource where the CSI-RS is arranged is presumed to be set to be the blank resource.

16. The mobile terminal apparatus of claim 15, wherein resources associated with area identifiers are divided into the groups by the base station apparatus in such a manner that adjacent areas are of one group, and the reception section receives the group identifier that is generated for each of the groups.

17. A communication control method comprising the steps of:

when position information of a CSI-RS (Channel State Information-Reference Signal) is sent to a mobile station apparatus by broadcasting, arranging the CSI-RS in a resource reserved for broadcasting, or when a mobile terminal apparatus obtains the position information of the CSI-RS based on an area identifier of a serving area, arranging the CSI-RS in a resource associated with the area identifier;

generating identification information for identifying whether the CSI-RS is arranged in the resource reserved for broadcasting or in the resource associated with the area identifier; and transmitting the identification information to the mobile terminal apparatus.

\* \* \* \* \*